(12) United States Patent
Yano et al.

(10) Patent No.: US 10,659,755 B2
(45) Date of Patent: May 19, 2020

(54) INFORMATION PROCESSING DEVICE, INFORMATION PROCESSING METHOD, AND PROGRAM

(71) Applicant: SONY CORPORATION, Tokyo (JP)

(72) Inventors: Akane Yano, Tokyo (JP); Tsubasa Tsukahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 15/744,201

(22) PCT Filed: May 24, 2016

(86) PCT No.: PCT/JP2016/065367
§ 371 (c)(1),
(2) Date: Jan. 12, 2018

(87) PCT Pub. No.: WO2017/022302
PCT Pub. Date: Feb. 9, 2017

(65) Prior Publication Data
US 2018/0205931 A1    Jul. 19, 2018

(30) Foreign Application Priority Data

Aug. 3, 2015 (JP) .................................. 2015-153314

(51) Int. Cl.
| H04N 13/00 | (2018.01) |
| G02B 27/01 | (2006.01) |
| H04N 13/128 | (2018.01) |
| G02B 30/40 | (2020.01) |

(Continued)

(52) U.S. Cl.
CPC ....... *H04N 13/128* (2018.05); *G02B 27/0172* (2013.01); *G02B 30/40* (2020.01); *H04N 13/275* (2018.05); *H04N 13/296* (2018.05)

(58) Field of Classification Search
None
See application file for complete search history.

(56) References Cited

U.S. PATENT DOCUMENTS

2005/0264557 A1* 12/2005 Kise ................... G06K 9/00201
345/419
2010/0017418 A1* 1/2010 Gopalakrishnan ..........................
G06F 17/30873
707/E17.044

(Continued)

*Primary Examiner* — Frederick D Bailey
(74) *Attorney, Agent, or Firm* — Paratus Law Group, PLLC

(57) ABSTRACT

There is provided an information processing device, an information processing method, and a program that can facilitate a user to perceive a stereoscopic vision object, the information processing device including: a display control unit configured to perform movement control of a stereoscopic vision object perceived by a user from a start depth that is different from a target depth to the target depth on a basis of mode specifying information that specifies a mode of the movement control that supports stereoscopic vision by the user, and an information processing method including: performing movement control of a stereoscopic vision object perceived by a user from a start depth that is different from a target depth to the target depth on a basis of mode specifying information that specifies a mode of the movement control that supports stereoscopic vision by the user.

19 Claims, 10 Drawing Sheets

(51) Int. Cl.
*H04N 13/296* (2018.01)
*H04N 13/275* (2018.01)

(56) References Cited

U.S. PATENT DOCUMENTS

| | | | | |
|---|---|---|---|---|
| 2012/0139902 A1* | 6/2012 | Fujisawa | .............. | H04N 13/111 |
| | | | | 345/419 |
| 2012/0154390 A1* | 6/2012 | Narita | ................... | H04N 13/128 |
| | | | | 345/419 |
| 2013/0050117 A1* | 2/2013 | Cho | ....................... | G06F 3/0488 |
| | | | | 345/173 |
| 2013/0106845 A1* | 5/2013 | Ko | ..................... | H04N 13/0022 |
| | | | | 345/419 |
| 2013/0141435 A1* | 6/2013 | Cho | ......................... | G06T 15/50 |
| | | | | 345/426 |
| 2013/0181982 A1* | 7/2013 | Tasaki | .................... | B60K 35/00 |
| | | | | 345/419 |
| 2015/0002507 A1* | 1/2015 | Ambrus | ............... | G02B 27/017 |
| | | | | 345/419 |
| 2015/0365607 A1* | 12/2015 | Yang | ......................... | G06K 9/20 |
| | | | | 348/164 |
| 2016/0173851 A1* | 6/2016 | Kim | ......................... | G06K 9/46 |
| | | | | 382/154 |

* cited by examiner

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/065367 (filed on May 24, 2016) under 35 U.S.C. § 371, which claims priority to Japanese Patent Application No. 2015-153314 (filed on Aug. 3, 2015), which are all hereby incorporated by reference in their entirety.

TECHNICAL FIELD

The present disclosure relates to an information processing device, an information processing method, and a program.

BACKGROUND ART

In recent years, researches and developments have been made on technology for allowing a user to three-dimensionally perceive images hereinafter also referred to as stereo display technology). Such stereo display technology includes a technique of allowing a user to perceive an image stereoscopically by controlling parallax between a left eye image and a right eye image (hereinafter also collectively referred to as image for stereoscopic vision).

However, the user's stereoscopic perception of the image (hereinafter also referred to as stereoscopic vision) is burdensome to the user. Hence, the stereo display technology that alleviates the burden on the user is desired. Note that in the following description, an image to be stereoscopically viewed is also referred to as a stereoscopic vision image or a stereoscopic vision object.

With respect to this, Patent Literature 1 describes an image processing device that automatically adjusts the depth of a stereoscopic vision image. Here, the depth is a degree of protrusion or withdrawal of an observation target perceived by a user from the screen. Thus, the observation target is displayed at a depth suitable for the user observing the stereoscopic vision image, and the burden on the user is reduced.

CITATION LIST

Patent Literature 1

Patent Literature 1: JP 2013-90031A

DISCLOSURE OF INVENTION

Technical Problem

However, it is difficult in some cases for the conventional stereo display technology to allow a user to stereoscopically view an image. For example, when the parallax or depth between the left eye image and the right eye image increases to some extent, the fusion of the left eye image and the right eye image is not likely to occur, and it is difficult for the user to stereoscopically view the image in some cases.

In view of this, the present disclosure proposes a new and improved information processing device, information processing method, and program that can facilitate a user to perceive a stereoscopic vision object.

Solution to Problem

According to the present disclosure, there is provided an information processing device including: a display control unit configured to perform movement control of a stereovision object perceived by a user from a start depth that is different from a target depth to the target depth on a basis of mode specifying information that specifies a mode of the movement control that supports stereovision by the user.

Further, according to the present disclosure, there is provided an information processing method including: performing movement control of a stereovision object perceived by a user from a start depth that is different from a target depth to the target depth on a basis of mode specifying information that specifies a mode of the movement control that supports stereovision by the user.

Further, according to the present disclosure, there is provided a program causing a computer to realize: a display control function of performing movement control of a stereovision object perceived by a user from a start depth that is different from a target depth to the target depth on a basis of mode specifying information that specifies a mode of the movement control that supports stereovision by the user.

Advantageous Effects of Invention

As described above, according to the present disclosure, there is provided an information processing device, an information processing method, and a program that can facilitate a user to perceive a stereoscopic vision object. Note that the effects described above are not necessarily limitative. With or in the place of the above effects, there may be achieved any one of the effects described in this specification or other effects that may be grasped from this specification.

MODES FOR CARRYING OUT THE INVENTION

Figure 1:
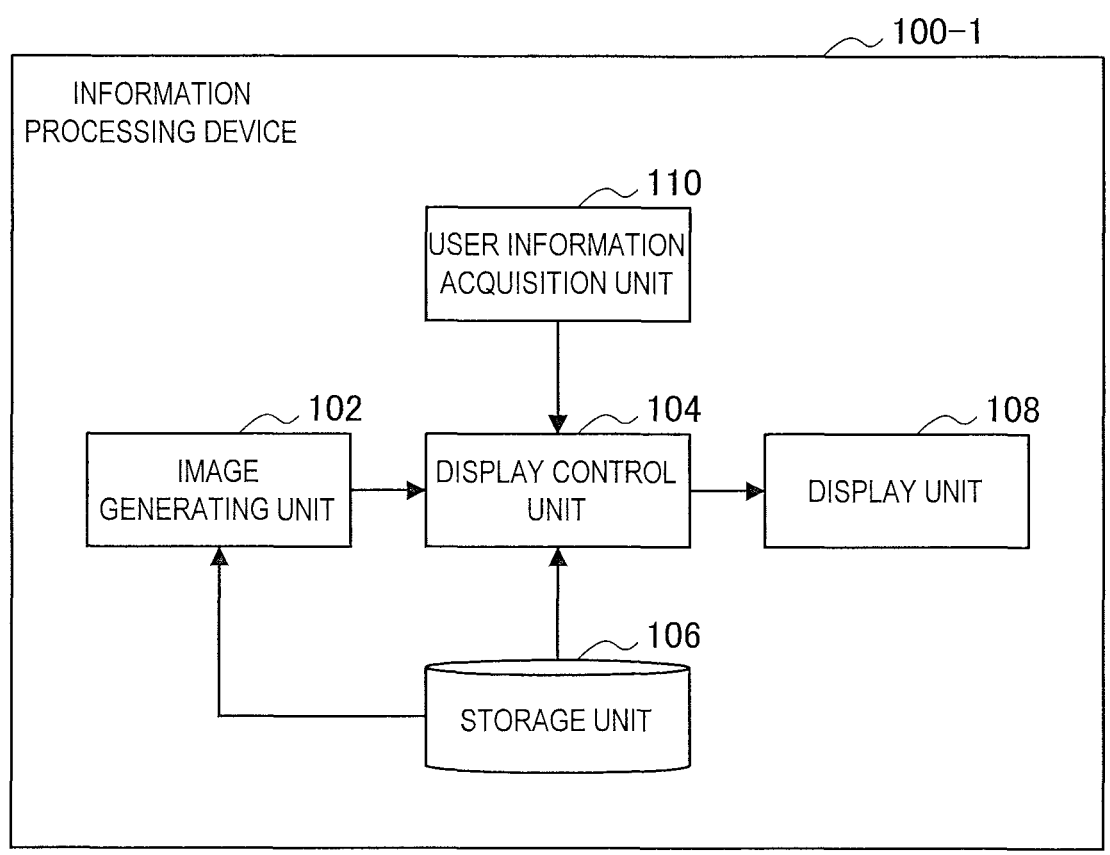
FIG. 1 is a block diagram showing an example of a schematic functional configuration of an information processing device according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, in the present specification and the drawings, different numbers are attached to the end of the same reference number to distinguish a plurality of components having substantially the same functional configuration from each other in some cases. For example, a plurality of components having substantially the same function are distinguished, such as a stereoscopic vision object 10A and a stereoscopic vision object 10B, as necessary. However, in a case where it is unnecessary to distinguish substantially the same functional configurations, only the same reference number is given thereto. For example, in a case where it is not particularly necessary to distinguish the stereoscopic vision object 10A and the stereoscopic vision object 10B from each other, they are simply referred to as the stereoscopic vision object 10.

The description will be now given in the following order.
1. First embodiment (movement control of stereoscopic vision object based on user information)
1-1. Device configuration
1-2. Technical features
1-3. Processing by device
1-4. Summary of first embodiment
1-5. Modification
2. Second embodiment (movement control of stereoscopic vision object based on environment information)
2-1. Device configuration
2-2. Technical features
2-3. Processing by device
2-4. Summary of first embodiment
3. Hardware configuration of information processing device according to embodiment of the present disclosure
4. Conclusion 1. FIRST EMBODIMENT (MOVEMENT CONTROL OF STEREOSCOPIC VISION OBJECT BASED ON USER INFORMATION)

First, an information processing device 100-1 according to a first embodiment of the present disclosure will be described.
<1-1. Device Configuration>
A functional configuration of the information processing device 100-1 according to the first embodiment of the present disclosure will be described with reference to FIG. 1. FIG. 1 is a block diagram showing an example of a schematic functional configuration of the information processing device 100-1 according to the first embodiment of the present disclosure.

As shown in FIG. 1, the information processing device 100-1 includes an image generating unit 102, a display control unit 104, a storage unit 106, a display unit 108, and a user information acquisition unit 110.

The image generating unit 102 generates an image to be displayed on the display unit 108. Specifically, the image generating unit 102 generates the image for causing the user to perceive the stereoscopic vision object on the basis of an instruction from the display control unit 104. For example, when an instruction to generate the image for stereoscopic vision is issued from the display control unit 104, the image generating unit 102 generates the left eye image and the right eye image on the basis of the information regarding the image stored in the storage unit 106. Note that these images for stereoscopic vision may be stored in the storage unit 106, or may be acquired from an external device through a communication unit or the like instead of the image generating unit 102.

Figure 2:
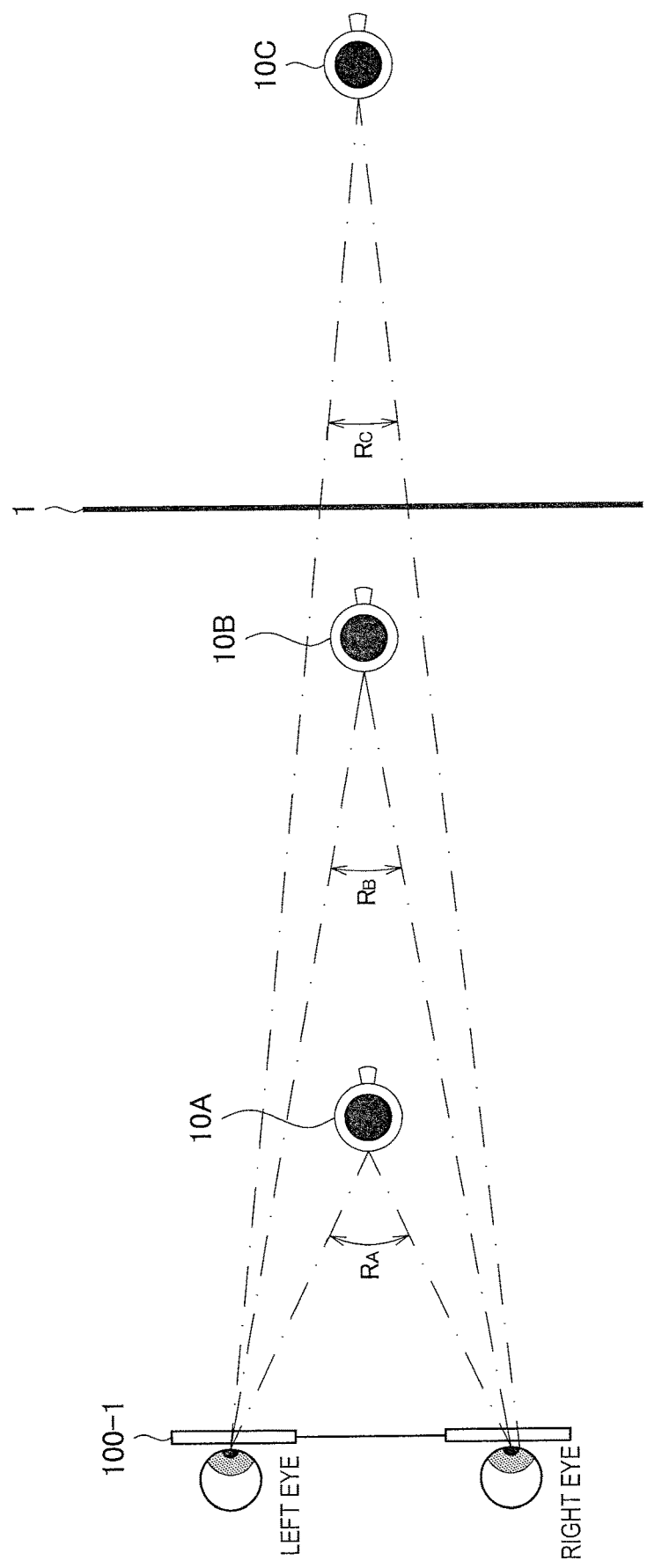
FIG. 2 is a diagram illustrating basic processing of display control of a stereoscopic vision object according to the embodiment.

The display control unit 104 performs display control of the image acquired from the image generating unit 102. Specifically, the display control unit 104 causes the user to perceive the stereoscopic vision object by controlling the parallax between the images generated by the image generating unit 102, that is, the left eye image and the right eye image. For example, the display control unit 104 controls the respective display positions of the left eye image and the right eye image in the horizontal direction, thereby controlling the depth of the stereoscopic vision object. Further, the display control processing of the stereoscopic vision object will be described in detail with reference to FIG. 2. FIG. 2 is a diagram illustrating basic processing of display control of a stereoscopic vision object according to the present embodiment.

The display control unit 104 performs processing for causing the user to stereoscopically view the acquired image. Specifically, in a case where the image for stereoscopic vision is set so as to be displayed on a virtual screen 1 as shown in FIG. 2, the display control unit 104 shifts the respective display positions of the images, that is, the left eye image and the right eye image, in the horizontal direction, that is, in the long-side direction of the virtual screen 1, thereby controlling the parallax between the left eye image and the right eye image. The parallax makes the user perceive the stereoscopic vision object 10. Here, the virtual screen means a surface on which a virtual image is displayed. Note that a surface on which a real image is displayed is also referred to as a real image screen or a real screen. In a case where a virtual screen and a real screen are not distinguished, they are also simply referred to as the screen. In addition, while the virtual screen can be planar, the virtual screen may also have a different shape such as a curved shape, a cylindrical shape or a spherical shape. In addition, while the position of the virtual screen can be optically set, the position may also be variable.

For example, in a case where the user is caused to perceive a stereoscopic vision object as if the stereoscopic vision object was located in front of the virtual screen 1, that is, the stereoscopic vision object protrudes toward the user, the display control unit 104 shifts the left eye image to the right in the horizontal direction and the right eye image to the left in the horizontal direction individually. In this case, the user perceives the stereoscopic vision object 10A which protrudes from the virtual screen 1 toward the user as shown in FIG. 2.

In addition, for example, in a case where the user is caused to perceive the stereoscopic vision object as if the stereovision object was located behind the virtual screen 1, that is, the stereoscopic vision object retracted toward the user, the display control unit 104 shifts the left eye image to the left in the horizontal direction and the right eye image to the right in the horizontal direction individually. In this case, the user perceives a stereoscopic vision object 10C which retracts from the virtual screen 1 as shown in FIG. 2 toward the user.

Note that, in a case where there is no parallax between the left eye image and the right eye image or in a case where the parallax is small enough not to be perceived by the human, one of the left eye image and the right eye image is visually recognized. For example, the user sees the image for stereoscopic vision on the virtual screen 1 as shown in FIG. 2.

Figure 3:
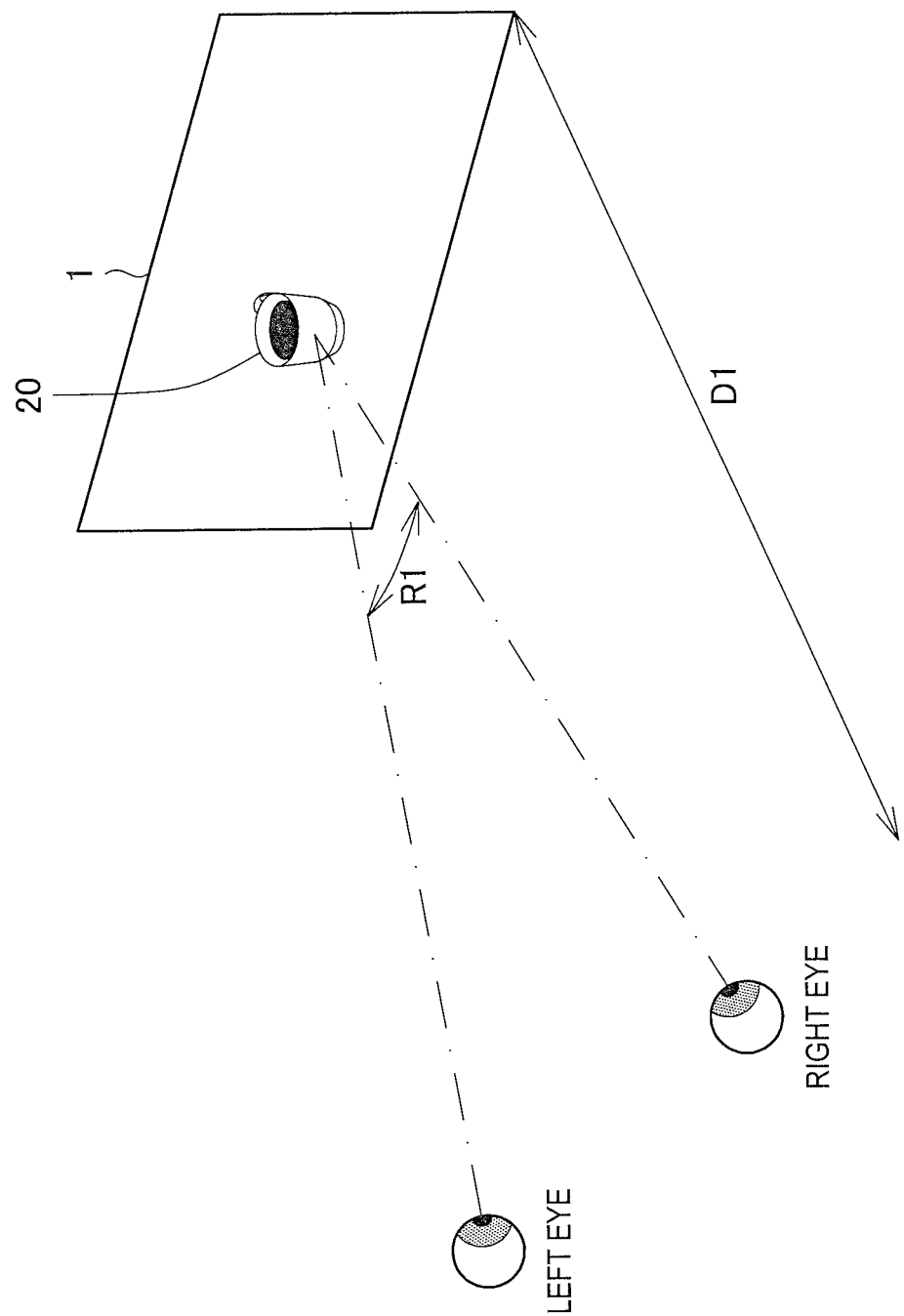
FIG. 3 is a diagram for describing action of eyes in a case where an image is not stereoscopically viewed.
Figure 4:
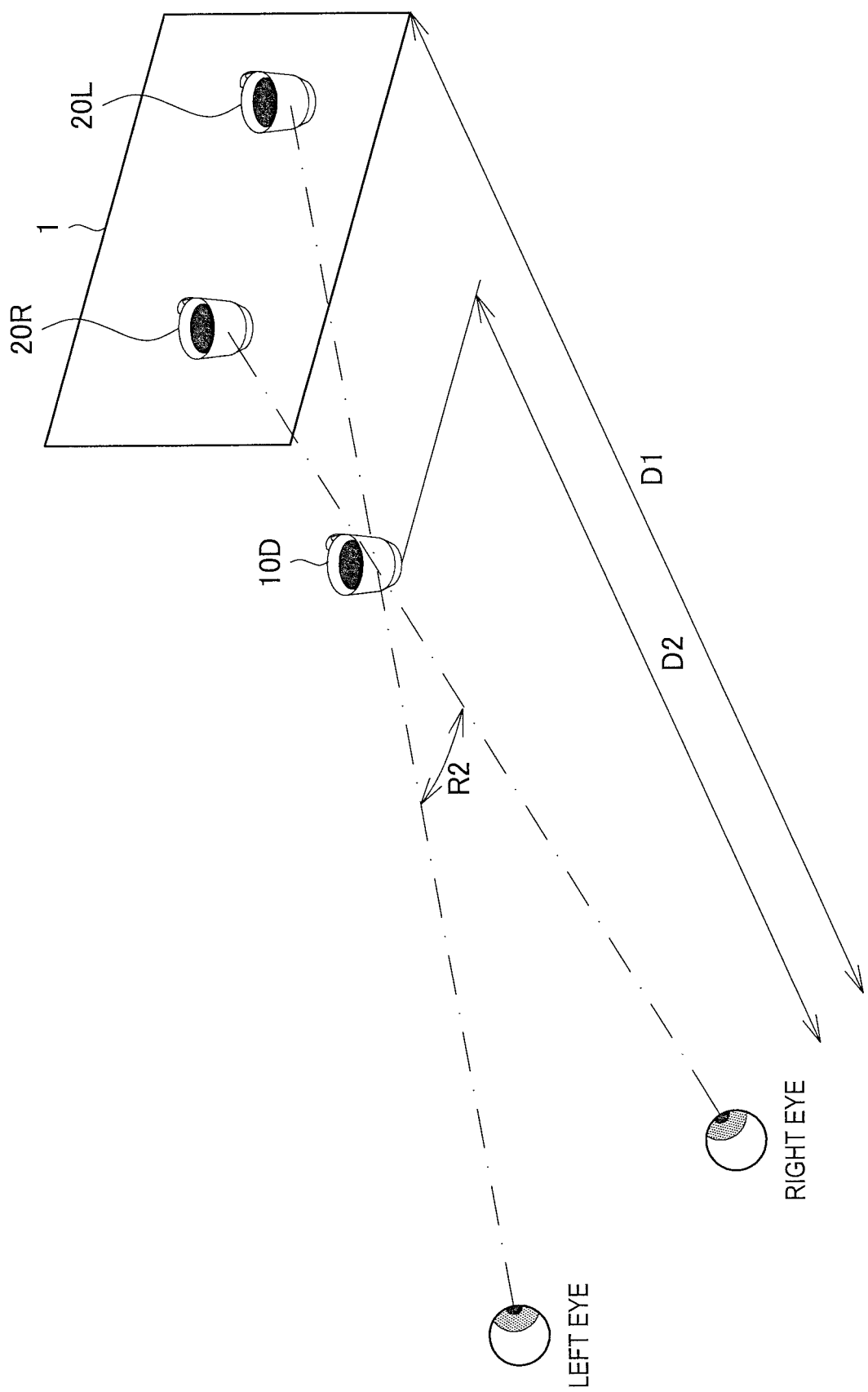
FIG. 4 is a diagram for describing the action of the eyes in a case where the image is stereoscopically viewed.

Here, it is difficult in some cases for the user to stereoscopically view a stereoscopic vision object. For example, when the parallax or depth between the left eye image and the right eye image increases to some extent, the fusion of the left eye image and the right eye image does not occur and it is difficult for the user to stereoscopically view the images. Further, with reference to FIG. 3 and FIG. 4, a situation where it is difficult to stereoscopically view the images will be described in detail. FIG. 3 is a diagram for describing the action of the eyes in a case where the image is not stereoscopically viewed, and FIG. 4 is a diagram for describing the action of the eyes in a case where images are stereoscopically viewed.

First, with reference to FIG. 3, a case where the image is not stereoscopically viewed will be described. In a case where the image is not stereoscopically viewed, that is, the depth is zero or small enough not to be perceived by the human, the user perceives that the image is present on the virtual screen on which the image is displayed. For example, in a case where an image 20 is displayed on the virtual screen 1 as shown in FIG. 3, the user's eyes adjust the thickness of the crystalline lenses so that the image 20 appearing on the virtual screen 1 comes into focus. In addition, the convergence of the user's left and right eyes is adjusted with respect to the image 20 appearing on the virtual screen 1. Here, the distance from the user's eye to the position (object) in focus is referred to as an adjustment distance, and the distance from the user's eye to the position (object) to be congested is referred to as a convergence distance. In the example of FIG. 3, the adjustment distance from the user's eyes to the virtual screen 1 and the convergence distance relating to a convergence angle R1 formed by both eyes of the user correspond to D1, for example, and they are equal with each other.

Next, with reference to FIG. 4, a case where the image is stereoscopically viewed will be described. In a case where the image is stereoscopically viewed, that is, the depth is large enough to be perceived by the human, the user perceives the image as if the image was present in front of or behind the virtual screen on which the image is displayed. For example, as shown in FIG. 4, in a case where the right eye image 20R and the left eye image 20L are displayed on the virtual screen 1 so as to have parallax, the user's eyes adjust the thickness of the crystalline lenses so that the images 20R and 20L appearing on the virtual screen come into focus. On the other hand, the convergence of the user's left and right eyes is adjusted with respect to a stereoscopic vision object 10D which is located in front of the virtual screen 1 with respect to the user. Hence, a difference occurs between the adjustment distance D1 from the user's eyes to the virtual screen 1 and a convergence distance D2 relating to a convergence angle R2 formed by both eyes of the user.

In a case where the difference between the adjustment distance and the convergence distance occurs, the user is burdened. In addition, adjusting the thickness of the crystalline lenses is likely to occur in accordance with the position where the convergence is adjusted. Accordingly, the image for stereoscopic vision comes out of focus when the adjustment is made so as to bring the virtual screen out of focus. As a result, the fusion of the stereoscopic vision object is not likely to occur. This is more likely to occur as the difference between the adjustment distance and the convergence distance increases. For example, as the depth of the stereoscopic vision object approaches the user, the fusion of the stereoscopic vision object is less likely to occur.

In view of this, an information processing device 100 according to each embodiment of the present disclosure has technical features as described later, thereby facilitating the user to perceive the stereoscopic vision object.

Returning to the description of the functional configuration of the information processing device 100-1 with reference to FIG. 1, the storage unit 106 stores information regarding the image displayed on the display unit 108 and information regarding the display control of the image.

The display unit 108 displays the image on the basis of an instruction from the display control unit 104. Specifically, the display unit 108 displays the image provided from the display control unit 104 in a predetermined stereoscopic vision system. For example, while the predetermined stereoscopic vision system can be a scope system including a head mount display (HMD) or the like mounted on the head of the user, other stereoscopic vision systems may be used. For example, the stereoscopic vision system may be other systems such as a glasses system including a liquid crystal shutter type, a polarization filter type and the like, and a glasses-free system including a lenticular type, a parallax barrier type and the like.

In addition, while the display method of the display unit 108 can be a so-called optical see-through method in which an image of a virtual image is displayed while transmitting an external image by using a half mirror or the like, other display methods may be used. For example, the display method may be a so-called video see-through method in which an external image is acquired using an imaging device and a real image obtained by superimposing an image on the acquired external image is displayed, or may be a retinal projection method in which an image is formed by directly irradiating the retina with image light.

The user information acquisition unit 110 acquires information regarding the user of the information processing device 100-1. Specifically, the information regarding the user includes information regarding an attribute of the user (hereinafter also referred to as user attribute information). For example, the attribute of the user includes the age, generation, sex, race, nationality, or the like of the user. In addition, the attribute information of the user includes information regarding features of the user. For example, the features of the user include the width (binocular width) between the left eye and the right eye of the user, sight, or the like. In addition, the information regarding the user includes the setting information of the user.

In addition, the information regarding the user includes information regarding an exercise of the user (hereinafter also referred to as user exercise information). More specifically, the information regarding the user's exercise is information regarding the mode of the exercise of the user. For example, the user's exercise includes an exercise relating to movement such as walking or running, an exercise relating to sports such as tennis or swimming, or the like. In addition, the mode of the exercise includes the presence or absence of the exercise, the degree of the exercise such as a movement speed or an exercise amount, or the like.

<1-2. Technical Features>

Next, the technical features of the information processing device 100-1 according to the present embodiment will be described.

(Basic Movement Control)

Figure 5:
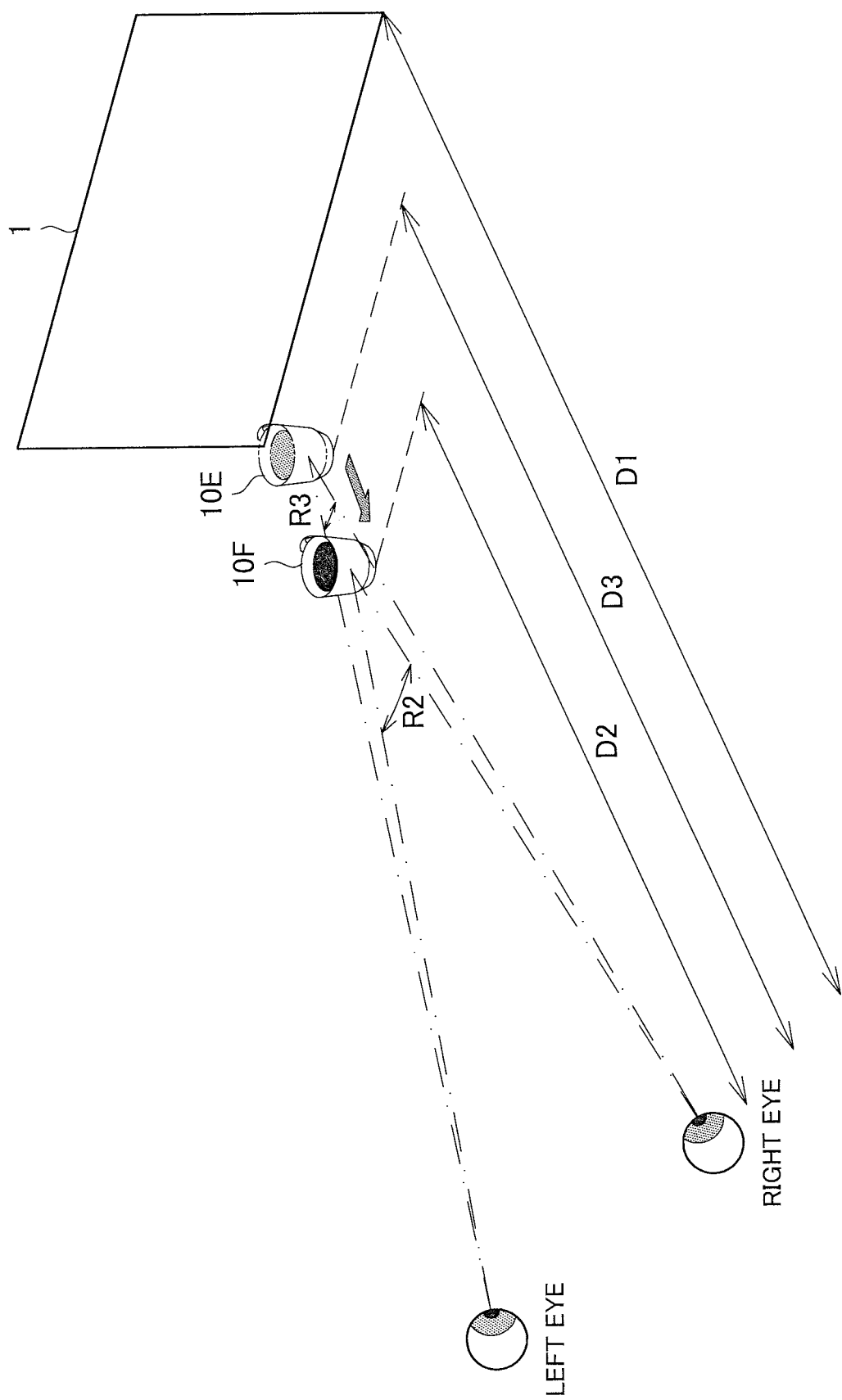
FIG. 5 is a diagram for describing movement control processing of the stereoscopic vision object in the information processing device according to the embodiment.

The information processing device 100-1 imparts movement in the depth direction to the stereoscopic vision object. Specifically, the display control unit 104 performs movement control of the stereoscopic vision object from the start depth which is different from the target depth to the target depth. Further, the movement control of the stereoscopic vision object will be described in detail with reference to FIG. 5. FIG. 5 is a diagram for describing movement control processing of the stereoscopic vision object in the information processing device 100-1 according to the present embodiment.

First, the display control unit 104 determines the target depth. Specifically, the display control unit 104 determines, by the movement control of the stereoscopic vision object, the depth of the stereoscopic vision object which it is desirable to cause the user to perceive. For example, the display control unit 104 determines, as the target depth, the depth at which the convergence angle of the user is R2 as shown in FIG. 5.

Next, the display control unit 104 determines the start depth. Specifically, the display control unit 104 determines the depth at which movement control of the stereoscopic vision object is started. More specifically, the display control unit 104 determines, as the start depth, the depth that is closer to the virtual screen than the target depth. For example, the display control unit 104 determines, as the start depth, the depth at which the convergence angle of the user is R3 as shown in FIG. 5. Hence, the start depth is set to be shallower than the target depth, whereby the stereoscopic vision object is displayed from a state in which the difference between the adjustment distance and the convergence distance is small. For example, as shown in FIG. 5, the difference between the convergence distance D3 at the start depth and the adjustment distance D1 is smaller than the difference between the convergence distance D2 at the target depth and the adjustment distance D1.

Next, the display control unit 104 determines the movement speed. Specifically, the display control unit 104 determines the speed of a change in the depth of the stereoscopic vision object from the start depth to the target depth. More specifically, it is determined that the speed of the change in the depth is a speed so that the movement time of the stereoscopic vision object is equal to or shorter than a predetermined time. For example, the predetermined time is the upper limit of the time at which the change in the depth of the stereoscopic vision object is not likely to be the burden on the user. Needless to say, since the predetermined time is different between individuals, the predetermined time may be adjusted within a certain range depending on the user.

Next, the display control unit 104 performs movement control of the stereoscopic vision object. Specifically, the display control unit 104 moves the stereoscopic vision object from the start depth to the target depth. For example, as shown in FIG. 5, the display control unit 104 performs parallax control so that a stereoscopic vision object 10E is perceived at the start depth, and changes the depth at the speed which is determined so that the stereoscopic vision object moves from the start depth toward the target depth. Then, when the depth of the stereoscopic vision object reaches the target depth, the display control unit 104 stops the change in the depth, and a stereoscopic vision object 10F is perceived by the user. Note that the update of the stereoscopic vision object relating to the movement can be performed at intervals of 200 milliseconds or more, for example.

Here, the time required for adjusting the thickness of the crystalline lens is said to be about 200 milliseconds. Hence, in a case where the depth is changed at intervals of 200 milliseconds or more, next change in the depth is easy to make after the adjustment to the depth to be changed is completed. Conversely, in a case where the depth is changed at intervals of less than 200 milliseconds, next change in the depth is easy to make before the adjustment to the depth to be changed is completed. Therefore, the change in the depth, that is, the update of the stereoscopic vision object, is performed at intervals of 200 milliseconds or more, thereby reducing the burden for stereoscopic vision, making it easy to perceive the stereoscopic vision object.

Note that in a case where the depth is changed at intervals of 200 milliseconds or more, the human is likely to perceive the change in the depth of the stereoscopic vision object as a continuous change. Conversely, in a case where the depth is changed at intervals of less than 200 milliseconds, the human is likely to perceive the change in the depth of the stereoscopic vision object as a discrete change.

In addition, in a case where the change in the display content of the stereoscopic vision object is likely to be recognized by the user as a continuous change, the change in the depth may be made in less than 200 milliseconds. This is because in a case where it is easy for the user to predict the change in the depth, the time taken for the above adjustment can be shortened to less than about 200 milliseconds. For example, in a case where the change in the display of the stereoscopic vision object is easy for the user to predict, the change in the depth is made in less than 200 milliseconds. Conversely, in a case where the change in the display content of the stereoscopic vision object is likely to be perceived by the user as a discrete change, it is difficult for the user to predict the change in the depth, and the time taken for the adjustment does not change from about 200 milliseconds or can be longer than about 200 milliseconds. Hence, in this case, it is desirable that the change in the depth be made in 200 milliseconds or more.

As described above, the depth of the stereoscopic vision object is changed from a depth shallower than the target depth toward the target depth. The adjustment of the thickness of the crystalline lens according to the convergence can be hereby suppressed.

(Movement Control for Supporting Stereoscopic Vision)

The information processing device 100-1 further performs movement control of the stereoscopic vision object on the basis of information by which the mode of movement control for supporting stereoscopic vision by the user is specified (hereinafter also referred to as mode specifying information). Specifically, the display control unit 104 determines the start depth on the basis of the mode specifying information. For example, the display control unit 104 determines, as the start depth, a depth such that a difference between the target depth and the start depth is a difference specified on the basis of the mode specifying information.

In addition, the display control unit 104 may determine the mode of the movement of the stereoscopic vision object on the basis of the mode specifying information. Specifically, the mode of the movement of the stereoscopic vision object is the movement speed of the stereoscopic vision object. For example, the display control unit 104 determines the speed specified on the basis of the mode specifying information as the movement speed of the stereoscopic vision object.

Here, the mode specification information can be user attribute information. Specifically, the display control unit 104 performs the movement control of the stereoscopic vision object with the start depth or the movement speed specified on the basis of the user attribute information obtained by the user information acquisition unit 110. For example, the display control unit 104 makes the start depth shallower, that is, closer to the virtual screen, as the age of the user is higher. In addition, the display control unit 104 slows the movement speed, that is, the speed of the change in the depth, as the age of the user is high. Generally speaking, as the human gets older, the function of their eyes deteriorates. Thus the time it takes to perform a convergence movement while maintaining the focus tends to increase. In view of this, in this case, the movement of the stereoscopic vision object is slowed, whereby the fusion of the image for stereopsis is likely to occur at the target depth.

In addition, the mode specifying information may be the user exercise information. Specifically, the display control unit 104 performs the movement control of the stereoscopic vision object with the start depth or the movement speed specified on the basis of the user motion information obtained by the user information acquisition unit 110. For example, in a case where the user is running, the display control unit 104 makes the movement of the stereoscopic vision object faster than, for example, the initial value as compared with the case where the user is standing still. Note that the display control unit 104 may determine the movement speed of the stereoscopic vision object according to the movement speed of the user. Generally, in a case where the user is moving, the congestion of the user who views the outside is changing according to the movement speed of the user. Hence, in a case where the movement control of the stereoscopic vision object corresponding to the change in the congestion is not performed, the user feels uncomfortable with the movement of the stereoscopic vision object, and further the burden on the user may increase. In view of this, in this case, the movement of the stereoscopic vision object is made faster, whereby the burden on the user is reduced In addition, the mode specifying information may be information regarding the stereoscopic vision object. Specifically, the display control unit 104 performs the movement control of the stereoscopic vision object with the start depth or the movement speed specified on the basis of the information regarding the type of the stereoscopic vision object. For example, in a case where the type of the stereoscopic vision object is content in which it is easy to form an image, the display control unit 104 determines, as the start depth, a depth that is deep, that is, a depth that is closer to the target depth than the initial value. Such content includes an object of letters or sentences, an object whose outline is clear, an object with high resolution, an object which is easy for the user to predict appearance, and the like. This is because the object which is easy to form an image is likely to fuse in general.

In addition, information regarding the stereoscopic vision object may be information regarding the visual mode of the stereoscopic vision object. Specifically, the display control unit 104 performs the movement control of the stereoscopic vision object with the start depth or the movement speed specified on the basis of the information regarding the depth of the stereoscopic vision object. For example, in a case where the target depth of the stereoscopic vision object is less than the threshold value, the display control unit 104 brings the start depth closer to the target depth than the initial value and makes the movement of the stereoscopic vision object faster than the initial value. Here, in a case where the depth is shallow, that is, in a case where the stereoscopic vision object is perceived distant from the user, the effect of the movement control of the stereoscopic vision object can be reduced, whereas the burden on the user due to the movement control occurs to some extent. Hence, in this case, the movement amount or the movement time of the stereoscopic vision object is reduced, thereby reducing the burden on the user.

In addition, information regarding the visual mode of the stereoscopic vision object may be information regarding the number of the stereoscopic vision objects. Specifically, the display control unit 104 performs the movement control of the stereoscopic vision object with the start depth or the movement speed specified on the basis of the information regarding the number of the stereoscopic vision objects. For example, in a case where a plurality of stereoscopic vision objects are present, the display control unit 104 determines, as the start depth, a depth that is deep, that is, a depth that is close to the target depth. In addition, in this case, the display control unit 104 makes the movement of the stereoscopic vision object faster than, for example, the initial value. Generally speaking, in a case where a plurality of stereoscopic vision objects are present, when the depths of some of the stereoscopic vision objects change, the burden on the user observing the stereoscopic vision objects increases, so that, for example, the user is likely to suffer from visually induced motion sickness. In view of this, in this case, the movement time of the stereoscopic vision object is shortened, thereby reducing the burden on the user. Note that while the example has been described in which the information regarding the number of the stereoscopic vision objects is information indicating the number of the stereoscopic vision objects, the information regarding the number of the stereoscopic vision objects may be information for deciding the amount of the stereoscopic vision objects.

<1-3. Processing by Device>

Figure 6:
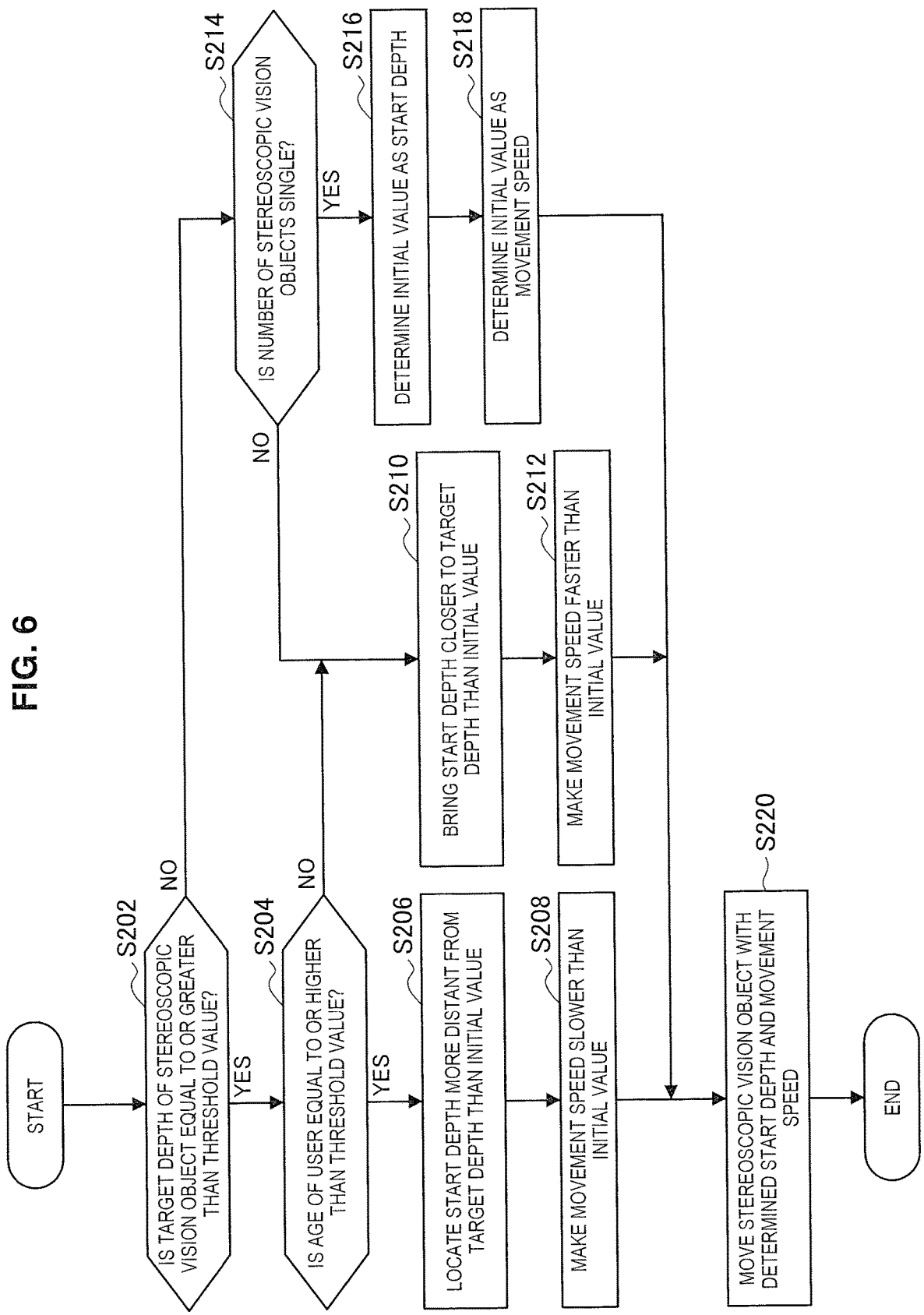
FIG. 6 is a flowchart conceptually showing processing by the information processing device according to the embodiment.

Next, the processing by the information processing device 100-1 according to the present embodiment will be described with reference to FIG. 6. FIG. 6 is a flowchart conceptually showing processing by the information processing device 100-1 according to the present embodiment.

The information processing device 100-1 decides whether the target depth of the stereoscopic vision object is equal to or greater than the threshold value (step S202). Specifically, the display control unit 104 determines the target depth of the stereoscopic vision object and decides whether the determined target depth is equal to or greater than the threshold value.

When it is decided that the target depth of the stereoscopic vision object is equal to or greater than the threshold value, the information processing device 100-1 decides whether the age of the user is equal to or higher than the threshold value (step S204). Specifically, in a case where the target depth is equal to or greater than the threshold value, the display control unit 104 decides whether the age of the user observing the stereoscopic vision object is equal to or higher than the threshold value on the basis of the user attribute information obtained by the user information acquisition unit 110.

When it is decided that the age of the user is equal to or higher than the threshold value, the information processing device 100-1 locates the start depth more distant from the target depth than the initial value (step S206). Specifically, in a case where the age of the user is equal to or higher than the threshold value, the display control unit 104 determines the start depth such that the difference between the start depth and the target depth, that is, the movement distance of the stereoscopic vision object, is greater than the initial value.

Next, the information processing device 100-1 makes the movement speed of the stereoscopic vision object slower than the initial value (step S208). Specifically, the display control unit 104 determines a value that is slower than the initial value as the movement speed of the stereoscopic vision object, that is, the speed of the change in the depth of the stereoscopic vision object. Note that the movement speed may be adjusted according to the difference between the start depth and the target depth, that is, the movement distance.

In addition, in a case where it is decided in step S204 that the age of the user is less than the threshold value, the information processing device 100-1 brings the start depth closer to the target depth than the initial value (step S210). Specifically, in a case where the age of the user is less than the threshold value, the display control unit 104 determines the start depth such that the difference between the start depth and the target depth, that is, the movement distance of the stereoscopic vision object, is smaller than the initial value.

Next, the information processing device 100-1 makes the movement speed of the stereoscopic vision object faster than the initial value (step S212). Specifically, the display control unit 104 determines a value that is faster than the initial value as the movement speed of the stereoscopic vision object, that is, the speed of the change in the depth of the stereoscopic vision object.

In addition, in a case where it is decided in step S202 that the target depth of the stereoscopic vision object is less than the threshold value, the information processing device 100-1 decides the number of stereoscopic vision objects (step S214). Specifically, in a case where the target depth is less than the threshold value, the display control unit 104 decides the number of stereoscopic vision objects that the display control unit 104 causes the user to perceive, that is, the number of images of which the stereoscopic control is performed.

In a case where it is decided that the number of stereoscopic vision objects is single, the information processing device 100-1 determines, as the start depth, the initial value (step S216). Specifically, in a case where the number of images of which the stereoscopic vision control is performed is single, the display control unit 104 determines, as the start depth, the initial value. Note that the initial value can be set or changed by the user.

Next, the information processing device 100-1 determines, as the movement speed, the initial value (step S218). Specifically, the display control unit 104 determines the initial value as the movement speed of the stereoscopic vision object, that is, the speed of the change in the depth of the stereoscopic vision object.

Note that in a case where it is decided in step S214 that the number of stereoscopic vision objects is plural, the processing proceeds to step S210.

Next, the information processing device 100-1 moves the stereoscopic vision object with the determined start depth and movement speed (step S220). Specifically, the display control unit 104 moves the stereoscopic vision object from the start depth to the target depth at the determined speed of the change in the depth. Note that in a case where the stereoscopic vision object has not been perceived by the user, that is, the image relating to the stereoscopic vision object is not displayed on the virtual screen, the image display and stereoscopic vision control are performed so that the stereoscopic vision object is perceived by the user at the start depth.

Note that while in the above flowchart, the example has been described in which both the start depth and the movement speed are controlled, only one of the start depth and the movement speed may be controlled.

<1-4. Summary of First Embodiment>

As described above, according to the first embodiment of the present disclosure, the movement control of the stereoscopic vision object perceived by the user from the start depth which is a depth different from the target depth to the target depth is performed on the basis of the mode specifying information that specifies the mode of movement control supporting the user's stereoscopic vision. Hence, the movement control of the stereoscopic vision object is performed so as to support the fusion of the stereoscopic vision object. The failure of stereoscopic vision is hereby suppressed or the time required for stereoscopic vision is shortened. In other words, it is possible to facilitate the user to perceive the stereoscopic vision object. In addition, the fusion of the stereoscopic vision object is supported. It is hereby possible to reduce the burden on the user relating to the stereoscopic vision such as visually induced motion sickness or eye fatigue. In addition, according to the present embodiment, the user can perceive the stereoscopic vision object for interaction with the user at hand. Hence, it is possible to give the user a further realistic feeling about the stereoscopic vision object.

In addition, the start depth includes a depth that is closer to the virtual screen than the target depth. Hence, the movement control is started from a depth where the difference between the convergence distance and the adjustment distance is small, thereby allowing the user to perform the convergence movement while maintaining a state of adjustment of the virtual screen. As a result, the fusion of the image for stereoscopic vision is easily maintained even at the target depth.

In addition, the mode of movement control includes a determination of the start depth. Here, the start depth is one of the main factors determining the likelihood of the fusion since the difference between the convergence distance and the adjustment distance for the start depth is smaller than that for any other depths in movement control. In view of this, determining the start depth on the basis of the mode specifying information can make it easy to control the likelihood of the fusion.

In addition, the start depth includes a depth where the difference between the target depth and the start depth is a difference specified on the basis of the mode specifying information. Here, the difference between the target depth and the start depth, that is, the length of the movement distance of the stereoscopic vision object, is related to the magnitude of the burden on the user and the likelihood of the fusion of the image for stereoscopic vision. In view of this, as in this configuration, the movement distance is controlled on the basis of the mode specifying information, whereby it is possible to balance the magnitude of the burden on the user and the likelihood of the fusion of the image for stereoscopic vision.

In addition, the mode of movement control includes a determination of the mode of the movement of the stereoscopic vision object. Here, the movement of the stereoscopic vision object, that is, the change in the depth of the stereoscopic vision object, serves as a support for the fusion as well as gives the burden on the user. In view of this, as in the present configuration, the mode of the movement is controlled on the basis of the mode specifying information, whereby it is possible to balance the magnitude of the burden on the user and the likelihood of the fusion of the image for stereoscopic vision.

In addition, the mode of the movement includes the movement speed of the stereoscopic vision object, and the movement speed includes the speed specified on the basis of the mode specifying information. Here, the movement time of the stereoscopic vision object varies according to the movement speed of the stereoscopic vision object. Generally speaking, the longer the movement time is, the greater the burden on the user is. In view of this, as in the present configuration, the movement speed is controlled on the basis of the mode specifying information, whereby the movement time is controlled, and it is possible to reduce the burden on the user while maintaining the likelihood of the fusion of the image for stereoscopic vision.

In addition, the mode specifying information includes information regarding the attribute of the user or information regarding the exercise of the user. Hence, the movement control of the stereoscopic vision object suitable for each user is performed, thereby making it possible to suppress the variations in the perceptibility of the stereoscopic vision object among users. For example, a case is considered where this configuration is applied to an application in which a stereoscopic vision object indicating a status such as a traveling distance or traveling time is displayed to a user riding a bicycle. In this case, taking the movement speed of the user into consideration, the movement of the stereoscopic vision object indicating the status, that is, animation, is performed, thereby making it possible to facilitate the moving user to perceive the stereoscopic vision object.

In addition, the mode specifying information includes information regarding the type of the stereoscopic vision object. Hence, the movement control of the stereoscopic vision object suitable for the type of the stereoscopic vision object is performed, thereby making it possible to suppress the variations in the perceptibility of the stereoscopic vision object among types of the stereoscopic vision object.

In addition, the mode specifying information includes information regarding the visual mode of the stereoscopic vision object. Hence, the movement control of the stereoscopic vision object suitable for the visual mode of the stereoscopic vision object is performed, thereby making it possible to suppress the variations in the perceptibility of the stereoscopic vision object among visual modes of the stereoscopic vision objects.

In addition, the information regarding the visual mode of the stereoscopic vision object includes information regarding the depth of the stereoscopic vision object. Hence, for example, in a case where the movement control of the stereoscopic vision object is performed according to the target depth of the stereoscopic vision object as described above, thereby making it possible to improve the likelihood of the fusion while suppressing an increase in the burden on the user.

In addition, the information regarding the visual mode of the stereoscopic vision object includes information regarding the number of the stereoscopic vision objects. Here, the burden on the user fluctuates depending on the number of stereoscopic vision objects. Hence, as described above, for example, in a case where a plurality of stereoscopic vision objects are present, the movement control is suppressed, that is, the movement time or the movement time is shortened, thereby making it possible to improve the likelihood of the fusion while suppressing an increase in burden on the user.

In addition, the information processing device 100-1 is mounted on the user's head. Hence, a change in perceptibility of the stereoscopic vision object due to the movement of the head of the user is not likely to occur, thereby making it possible to give the user a realistic feeling about the stereoscopic vision object.

<1-5. Modification>

The first embodiment of the present disclosure has been described above. Note that the present embodiment is not limited to the above examples. Hereinafter, first to third modifications of the present embodiment will be described.

(First Modification)

Figure 7:
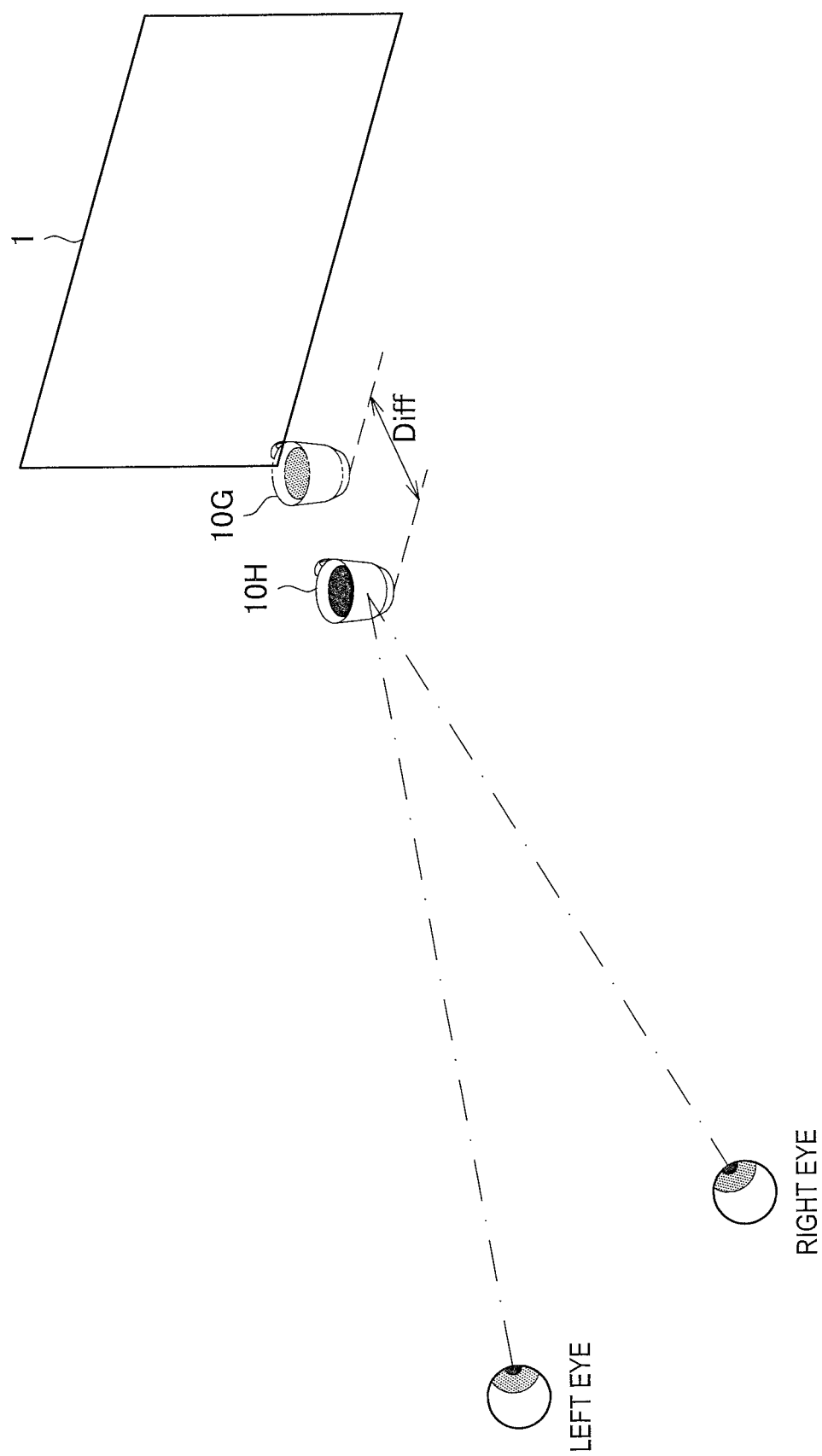
FIG. 7 is a diagram for describing an example of movement control processing of the stereoscopic vision object based on depth of a past stereoscopic vision object in the information processing device according to a first modification of the embodiment.

As the first modification of the present embodiment, the information processing device 100-1 may perform movement control of the stereoscopic vision object according to the depth of the past stereoscopic vision object. Specifically, the display control unit 104 performs the movement control of the stereoscopic vision object according to the difference between the target depth and the depth of the past stereoscopic vision object. Further, the processing in the present modification will be described in detail with reference to FIG. 7. FIG. 7 is a diagram for describing an example of the movement control processing of a stereoscopic vision object based on the depth of the past stereoscopic vision object in the information processing device 100-1 according to the first modification of the present embodiment.

First, when the target depth is determined, the display control unit 104 acquires the depth of the past stereoscopic vision object. For example, the display control unit 104 first determines, as the target depth of the stereoscopic vision object of which the stereoscopic vision control is scheduled to be performed, the depth of a stereoscopic vision object 10H as shown in FIG. 7. Next, the display control unit 104 acquires the depth of a stereoscopic vision object 10G as shown in FIG. 7 of which stereoscopic vision control was performed in the past. Note that the past stereoscopic vision object can be a stereoscopic vision object which has been perceived by the user until just before, that is, a stereoscopic vision object of which stereoscopic vision control has been performed.

Next, the display control unit 104 specifies the difference between the depth of the past stereoscopic vision object and the target depth. For example, the display control unit 104 calculates a difference Diff between the depth of the acquired past stereoscopic vision object 10G and the target depth of the stereoscopic vision object of which stereoscopic vision control is scheduled to be performed, that is, the depth of the stereoscopic vision object 10H.

Next, the display control unit 104 determines the mode of movement control according to the difference. Specifically, the display control unit 104 determines the start depth or the movement speed according to the magnitude of the calculated difference Diff. For example, the display control unit 104 determines as follows; the smaller the calculated difference Diff is, the shallower the start depth is, that is, the movement distance is shortened, and the faster the movement speed is, that is, the movement time is shortened.

Next, the display control unit 104 performs the movement control of the stereoscopic vision object on the basis of the determined mode of the movement control. For example, the display control unit 104 performs the movement control of the stereoscopic vision object on the basis of the determined start depth and movement speed.

Note that in a case where a plurality of stereoscopic vision objects are present and in a case where a plurality of stereoscopic vision objects were present in the past, the above processing is performed using the depth of the stereoscopic vision object that is visually recognized by the user or the depth of the stereoscopic vision object that was visually recognized. The user's visual recognition target is detected on the basis of the user's line of sight.

As described above, according to the first modification of the present embodiment, the information regarding the depth of the stereoscopic vision object includes information regarding the difference between the target depth and the depth of the past stereoscopic vision object. Hence, the mode of the movement control of the stereoscopic vision object is controlled according to the depth of the stereoscopic vision object which the user visually recognized in the past, thereby making it possible to efficiently improve the likelihood of the fusion while suppressing an increase in the burden on the user.

(Second Modification)

As a second modification of the present embodiment, in a case where a plurality of stereoscopic vision objects are present, the information processing device 100-1 may prevent the user from perceiving stereoscopic vision objects that are not subject to the movement control. Specifically, when moving the stereoscopic vision object, the display control unit 104 prevents the user from perceiving stereoscopic vision objects other than the stereoscopic vision object to be moved.

For example, before starting the movement control of the stereoscopic vision object, the display control unit 104 decides whether other stereoscopic vision objects different from the stereoscopic vision object to be subject to the movement control are present. Then, in a case where it is decided that the other stereoscopic vision objects are present, the display control unit 104 deletes the image for stereoscopic vision relating to the other stereoscopic vision objects from the virtual screen.

Note that instead of deleting the image for stereoscopic vision, the display control unit 104 may prevent the other stereoscopic vision objects from being stereoscopically viewed by the user. For example, the display control unit 104 stops the stereoscopic vision control of the other stereoscopic vision objects.

In addition, the display control unit 104 may make it difficult for the user to visually recognize the other stereoscopic vision objects. For example, the display control unit 104 lowers the luminance of the image for stereoscopic vision relating to the other stereoscopic vision objects, darkens the brightness, or changes its color to a color close to a dark color or background color.

In addition, after the movement of the stereoscopic vision object is completed, the display control unit 104 may restore the other stereoscopic vision objects on which the above processing has been performed.

As described above, according to the second modification of the present embodiment, when moving the stereoscopic vision object, the information processing device 100-1 prevents the user from perceiving the stereoscopic vision objects other than the stereoscopic vision object to be moved. As described above, when the movement control of the stereoscopic vision object is performed in a state in which a plurality of stereoscopic vision objects are present, the burden on the user can increase. In view of this, as in the present configuration, preventing the user from perceiving stereoscopic vision objects that are not subject to the movement control can suppress an increase in the burden on the user.

(Third Modification)

As a third modification of the present embodiment, the information processing device 100-1 may make conspicuous the stereoscopic vision object that is subject to the movement control. Specifically, the display control unit 104 emphasizes the presence of the stereoscopic vision object while the stereoscopic vision object is moved. More specifically, the display control unit 104 starts to put a visual emphasis on the stereoscopic vision object at the start of the movement of the stereoscopic vision object. For example, the visual emphasis includes changing a color, luminance, or pattern of the whole or part of the stereoscopic vision object so that the color, luminance, or pattern can be easily seen, blinking the stereoscopic vision object, changing the stereoscopic vision object to conspicuous content, having the stereoscopic vision object accompanied by another conspicuous object, and the like.

Note that the emphasis processing may be performed from the start to the end of the movement of the stereoscopic vision object, or the emphasis processing may be performed until a predetermined time elapses from the start of the movement or until the stereoscopic vision object is moved by a predetermined distance. In addition, the degree of the emphasis may be changed during the movement. For example, the degree of the emphasis can be lowered as the stereoscopic vision object is moved.

As described above, according to the third modification of the present embodiment, the information processing device 100-1 emphasizes the presence of the stereoscopic vision object while the stereoscopic vision object is moved. Here, unless the user visually recognizes the movement of the stereoscopic vision object, the effect is not sufficiently exhibited. In particular, it is desirable that the movement of the stereoscopic vision object be visually recognized by the user from the start time. In view of this, as in the present configuration, the target for the movement of the stereoscopic vision object is emphasized to the user, whereby the movement of the stereoscopic vision object can be easily perceived by the user, and the fusion of the image for stereoscopic vision can be more reliably supported.

2. SECOND EMBODIMENT (MOVEMENT CONTROL OF STEREOSCOPIC VISION OBJECT BASED ON ENVIRONMENT INFORMATION)

The information processing device 100-1 according to the first embodiment of the present disclosure has been described above. Subsequently, an information processing device 100-2 according to a second embodiment of the present disclosure will be described.

<2-1. Device Configuration>

Figure 8:
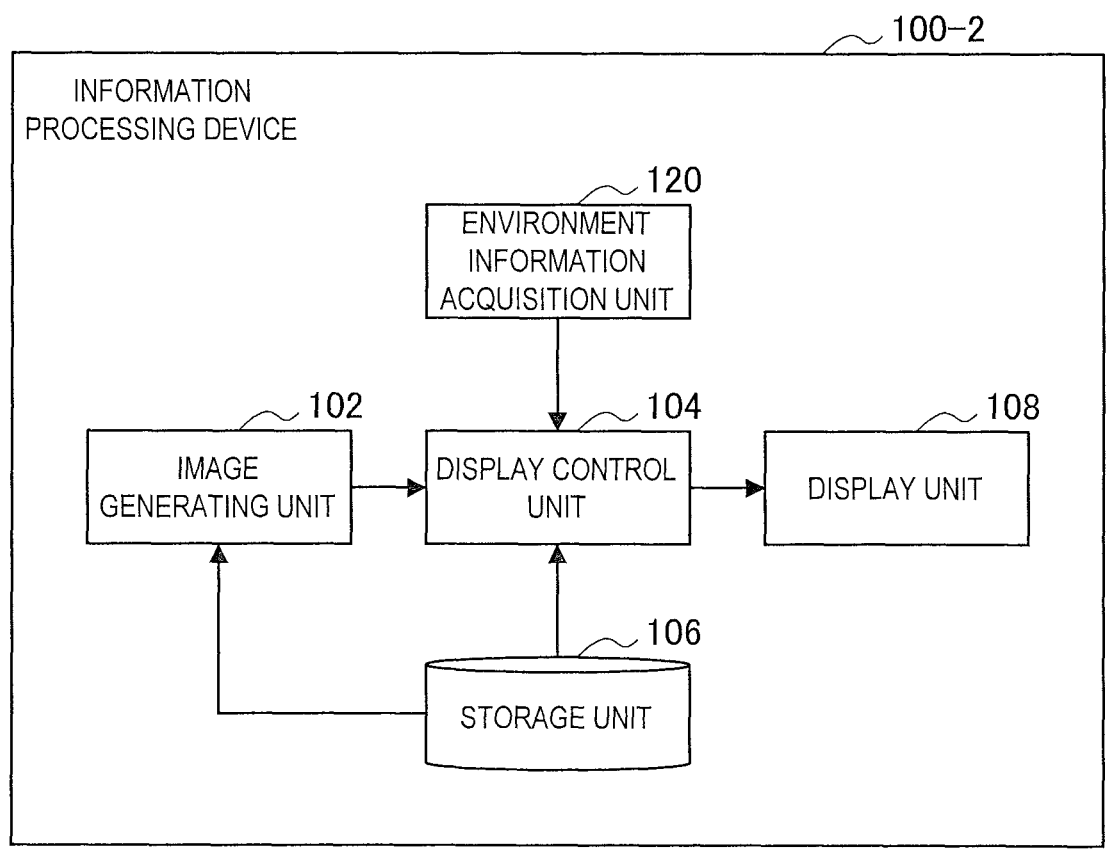
FIG. 8 is a block diagram showing an example of a schematic functional configuration of the information processing device according to a second embodiment of the present disclosure.

First, referring to FIG. 8, the functional configuration of the information processing device 100-2 according to the second embodiment of the present disclosure will be described. FIG. 8 is a block diagram showing an example of a schematic functional configuration of the information processing device 100-2 according to the second embodiment of the present disclosure.

As shown in FIG. 8, the information processing device 100-2 includes an environment information acquisition unit 120 in addition to the image generating unit 102, the display control unit 104, the storage unit 106, and the display unit 108.

The environment information acquisition unit 120 acquires information regarding the environment surrounding the user (hereinafter also referred to as environment information). Specifically, the environment information includes information regarding a visual mode of a space perceived such that a stereoscopic vision object is present (hereinafter also referred to as display space). For example, the visual mode of the display space includes the presence or absence, number, arrangement, and movement of an object, change thereof, or the like.

<2-2. Technical Features>

Next, technical features of the information processing device 100-2 according to the present embodiment will be described.

(Movement Control to Support Stereoscopic Vision)

The information processing device 100-2 performs the movement control of the stereoscopic vision object on the basis of the environment information. Specifically, the display control unit 104 performs the movement control of the stereoscopic vision object with the start depth or the movement speed specified on the basis of the information regarding the visual mode of the display space obtained by the environment information acquisition unit 120. For example, in a case where an object is present in the display space, the display control unit 104 determines, as the start depth, a depth that is deep, that is, a depth that is close to the target depth. In addition, in this case, the display control unit 104 makes the movement of the stereoscopic vision object faster than, for example, the initial value. Here, since the convergence movement is performed even in a case where the object which is present in the actual space is visually recognized, the burden on the user increases when the line of sight moves between the stereoscopic vision object and the object in the actual space. In view of this, in this case, shortening the movement time of the stereoscopic vision object reduces the burden on the user (Control of Whether to Move Stereoscopic Vision Object)

The information processing device 100-2 further controls whether to move the stereoscopic vision object. Specifically, the display control unit 104 determines whether to move the stereoscopic vision object on the basis of the mode specifying information. More specifically, the display control unit 104 determines whether to move the stereoscopic vision object on the basis of the depth of the stereoscopic vision object. For example, in a case where the difference between the target depth and the depth of the past stereoscopic vision object is smaller than the threshold value, the display control unit 104 determines not to move the stereoscopic vision object.

In addition, the display control unit 104 may determine whether to move the stereoscopic vision object on the basis of types of the stereoscopic vision object. For example, in a case where the type of the stereoscopic vision object is content in which it is easy to form an image, the display control unit 104 determines not to move the stereoscopic vision object.

In addition, the display control unit 104 may determine whether to move the stereoscopic vision object on the basis of the number of stereoscopic vision objects. For example, in a case where a plurality of stereoscopic vision objects are present, the display control unit 104 determines not to move the stereoscopic vision object. Note that the display control unit 104 may determine whether to move the stereoscopic vision object on the basis of the presence or absence of the object or the number of the objects in the display space.

(Re-Execution of Movement Control)

The information processing device 100-2 re-executes the movement of the stereoscopic vision object in a case where the movement of the stereoscopic vision object is not visually recognized by the user. Specifically, in a case where the user's visual recognition of the stereoscopic vision object is interrupted during the movement of the stereoscopic vision object, the display control unit 104 moves the stereoscopic vision object again.

For example, when the movement of the stereoscopic vision object is started, the display control unit 104 starts acquiring, from a line of sight information acquisition unit that acquires information regarding the user's line of sight (hereinafter also referred to as line of sight information), the line of sight information. The line of sight information acquisition unit is separately included in the information processing device 100-2. Note that the line of sight information may be periodically acquired irrespective of the presence or absence of the movement control.

Next, while performing the movement processing of the stereoscopic vision object, the display control unit 104 decides whether the line of sight of the user is directed to the stereoscopic vision object on the basis of the line of sight information.

When it is decided that the line of sight of the user is not directed to the stereoscopic vision object, the display control unit 104 interrupts the movement of the stereoscopic vision object and starts moving the stereoscopic vision object again from the start depth.

Note that, in a case where it is decided that the line of sight of the user is not directed to the stereoscopic vision object, the display control unit 104 may continue the movement of the stereoscopic vision object, move the stereoscopic vision object to the target depth, and then start moving the stereoscopic vision object again from the start depth.

In addition, the display control unit 104 may determine whether to re-execute the movement of the stereoscopic vision object according to the time period during which the user gazes at the stereoscopic vision object. This is because if the time period during which the user gazes at the stereoscopic vision object is long, the fusion of the image for stereoscopic vision will occur with high possibility.

In addition, in the above description, the example has been described in which the interruption of the visual recognition of the stereoscopic vision object is decided on the basis of the change in the line of sight of the user. The interruption of the visual recognition may be decided on the basis of the presence or absence of the occurrence of the object that changes the line of sight of the user. For example, the display control unit 104 decides whether to re-execute the movement of the stereoscopic vision object on the basis of the presence or absence of the occurrence of the object in the display space during the movement of the stereoscopic vision object.

<2-3. Processing by Device>

Figure 9:
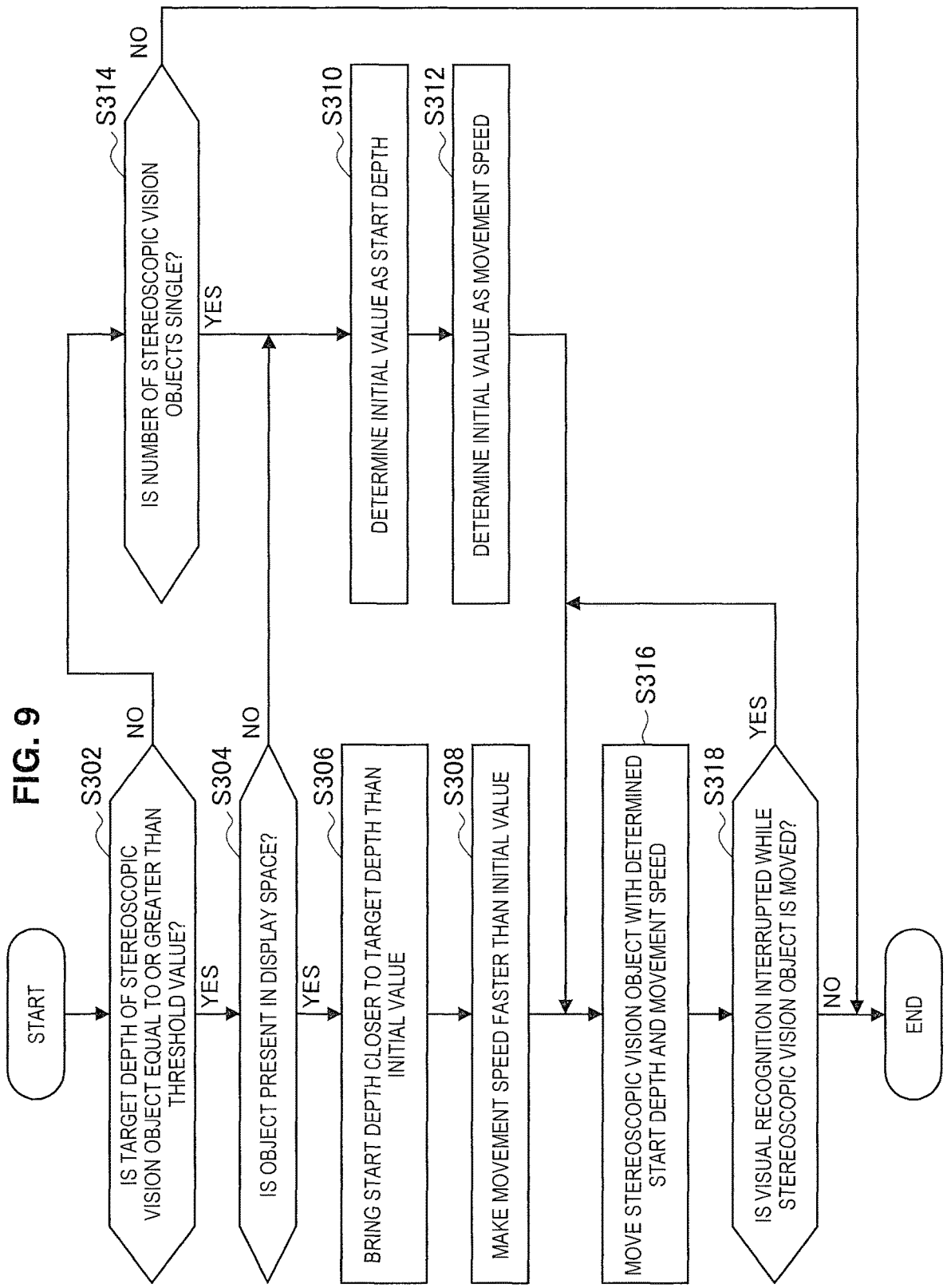
FIG. 9 is a flowchart conceptually showing processing by the information processing device according to the embodiment.

Next, processing by the information processing device 100-2 according to the present embodiment will be described with reference to FIG. 9. FIG. 9 is a flowchart conceptually showing the processing by the information processing device 100-2 according to the present embodiment. Note that the description of the processing that is substantially the same as the processing in the first embodiment will be omitted.

The information processing device 100-2 decides whether the target depth of the stereoscopic vision object is equal to or greater than the threshold value (step S302).

When it is decided that the target depth of the stereoscopic vision object is equal to or greater than the threshold value, the information processing device 100-2 decides whether the object is present in the display space (step S304). Specifically, in a case where the target depth is equal to or greater than the threshold value, the display control unit 104 decides whether the object is present in the display space on the basis of the environment information obtained by the environment information acquisition unit 120.

When it is decided that the object is present in the display space, the information processing device 100-2 brings the start depth closer to the target depth than the initial value (step S306). Specifically, in a case where the object is present in the display space, the display control unit 104 determines the start depth such that the difference between the start depth and the target depth, that is, the movement distance of the stereoscopic vision object, is smaller than the initial value.

Next, the information processing device 100-2 makes the movement speed of the stereoscopic vision object faster than the initial value (step S308). Specifically, the display control unit 104 determines a value that is faster than the initial value as the movement speed of the stereoscopic vision object, that is, the speed of the change in the depth of the stereoscopic vision object.

In addition, in a case where it is decided in step S304 that no object is present in the display space, the information processing device 100-2 determines, as the start depth, the initial value (step S310), and determines, as the movement speed of the stereoscopic vision object, the initial value (step S312).

In addition, in a case where it is decided in step S302 that the target depth of the stereoscopic vision object is less than the threshold value, the information processing device 100-2 decides the number of stereoscopic vision objects (step S314). In a case where it is decided that the number of stereoscopic vision objects is single, the processing proceeds to step S310. In addition, in a case where it is decided in step S314 that the number of stereoscopic vision objects is plural, the information processing device 100-2 does not move the stereoscopic vision object and the processing ends.

Next, the information processing device 100-2 moves the stereoscopic vision object with the determined start depth and movement speed (step S316).

While moving the stereoscopic vision object, the information processing device 100-2 decides whether the user's visual recognition of the stereoscopic vision object is interrupted (step S318). Specifically, the display control unit 104 decides whether the line of sight of the user is directed to the stereoscopic vision object on the basis of the line of sight information that is periodically acquired.

When it is decided that user's visual recognition of the stereoscopic vision object is interrupted, the information processing device 100-2 executes the movement of the stereoscopic vision object again. Specifically, when it is decided that the line of sight of the user is not directed to the stereoscopic vision object, the display control unit 104 returns the processing to step S316 to re-execute the movement of the stereoscopic vision object, <2-4. Summary of Second Embodiment>

As described above, according to the second embodiment of the present disclosure, the mode specifying information includes environment information regarding the environment surrounding the user, and the information processing device 100-2 performs the movement control of the stereoscopic vision object on the basis of the environment information. Hence, performing the movement control of the stereoscopic vision object suitable for the environment surrounding the user can make the stereoscopic vision object easy to perceive irrespective of the environment.

In addition, the information processing device 100-2 determines whether to move the stereoscopic vision object on the basis of the mode specifying information. Hence, in a case where the stereoscopic vision object is easily perceived, the stereoscopic vision object is not moved, whereby it is possible to prevent the unnecessary burden on the user.

In addition, when the user's visual recognition of the stereoscopic vision object is interrupted while the stereoscopic vision object is moved, the information processing device 100-2 moves the stereoscopic vision object again. Hence, adding an opportunity to provide support for the stereoscopic vision makes it possible to raise the possibility that the user can perceive the stereoscopic vision object.

3. HARDWARE CONFIGURATION OF INFORMATION PROCESSING DEVICE ACCORDING TO EMBODIMENT OF THE PRESENT DISCLOSURE

The information processing device 100 according to each embodiment of the present disclosure has been described above. The processing by the information processing device 100 described above is performed by the cooperation of software, and hardware of the information processing device 100 described below.

Figure 10:
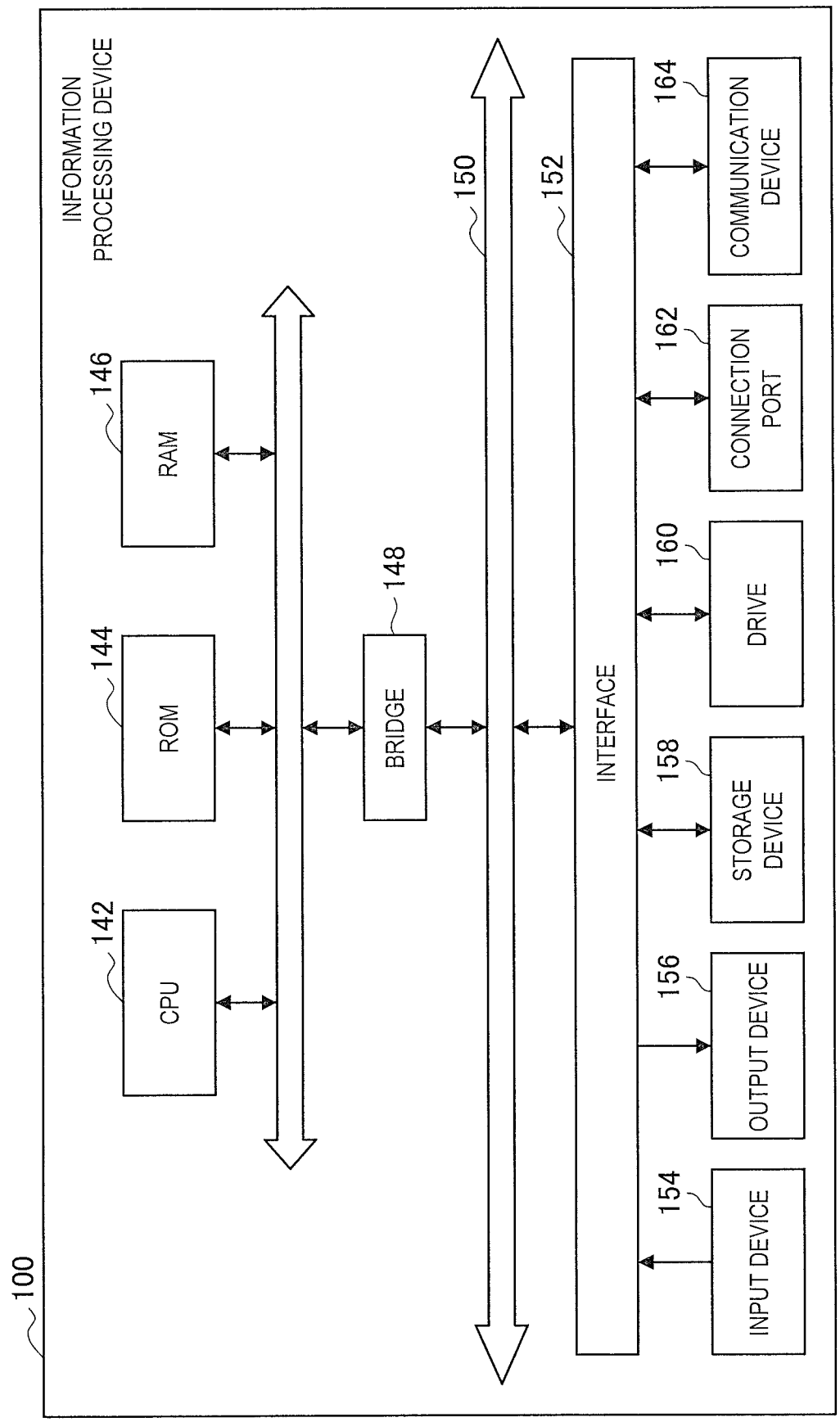
FIG. 10 is an explanatory diagram showing a hardware configuration of the information processing device according to an embodiment of the present disclosure.

FIG. 10 is an explanatory diagram showing the hardware configuration of the information processing device 100 according to an embodiment of the present disclosure. As shown in FIG. 10, the information processing device 100 includes a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as an arithmetic processing unit and cooperates with various programs to perform operations of the image generating unit 102 and the display control unit 104 in the information processing device 100. In addition, the CPU 142 may be a microprocessor. The ROM 144 stores programs, computation parameters, or the like to be used by the CPU 142. The RAM 146 temporarily stores programs to be used in the execution of the CPU 142, parameters or the like that appropriately change in the execution, or the like. Part of the storage unit 106 in the information processing device 100 includes the ROM 144 and the RAM 146. The CPU 142, the ROM 144, and the RAM 146 are connected to each other via an internal bus including a CPU bus or the like.

The input device 154 includes, for example, input means for a user to input information such as a mouse, a keyboard, a touch panel, a button, a microphone, a switch and a lever, an input control circuit that generates an input signal on the basis of an input by a user and outputs the input signal to the CPU 142, and the like. By operating the input device 154, the user of the information processing device 100 can input various data to the information processing device 100 and instruct the information processing device 100 about processing operations.

The output device 156 makes an output to a device such as a liquid crystal display (LCD) device, an organic light emitting diode (OLED) device, or a lamp as an example of the display unit 108 in the information processing device 100. Further, the output device 156 may make sound outputs of a speaker, a headphone, or the like.

The storage device 158 is a device for storing data. The storage device 158 may include a storage medium, a recording device that records data in the storage medium, a readout device that reads data from the storage medium, a deletion device that deletes data recorded in the storage medium, and the like. The storage device 158 stores programs executed by the CPU 142, and various data.

The drive 160 is a reader/writer for a storage medium, which is incorporated in or externally attached to the information processing device 100. The drive 160 reads information recorded in a magnetic disk, an optical disc, and a magneto-optical disk which are attached to the drive 160, or a removable storage medium such as a semiconductor memory, and outputs the information to the RAM 134. In addition, the drive 160 can also write information to the removable storage medium.

The connection port 162 is, for example, a bus for connecting to an information processing device or a peripheral device that is disposed outside the information processing device 100. In addition, the connection port 162 may be a universal serial bus (USB).

The communication device 164 is, for example, a communication interface including a communication device for connecting to a network. The communication device 164 may be an infrared communication compatible device, a wireless local area network (LAN) compatible communication device, a long term evolution (LIE) compatible communication device, or a wire communication device that performs wired communication.

4. CONCLUSION

As described above, according to the first embodiment of the present disclosure, the movement control of the stereoscopic vision object is performed so as to support the fusion of the stereoscopic vision object, whereby failure of stereoscopic vision is suppressed or the time required for stereoscopic vision is shortened. In other word, it is possible to facilitate the user to perceive the stereoscopic vision object. In addition, supporting the fusion of the stereoscopic vision object makes it possible to reduce the burden on the user relating to stereoscopic vision such as visually induced motion sickness or eye fatigue. In addition, according to the second embodiment of the present disclosure, the movement control of the stereoscopic vision object suitable for the environment surrounding the user is performed, whereby it is possible to make the stereoscopic vision object easy to perceive irrespective of the environment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiments, the information processing device 100 is an HMD. The present technology, however, is not limited to such an example. For example, the information processing device 100 may be another device such as a stationary or portable three dimensional (3D) display or a 3D movie projector.

In addition, in the above embodiments, the example has been described in which the depth of the stereoscopic vision object is changed. In addition to the change in the depth, the display position of the stereoscopic vision object may be changed. For example, the depth can be changed while the display position of the stereoscopic vision object is changed at least one of upward, downward, leftward and rightward as viewed from the user. In this case, the user perceives the stereoscopic vision object moving, for example, by curving or meandering.

In addition, in the above embodiments, the example has been described in which the image for stereoscopic vision is displayed on the virtual screen. It is possible to apply the configuration of each embodiment even in a case where the image for stereoscopic vision is displayed on the real screen.

In addition, in the above embodiments, the example has been described in which the mode of the movement of the stereoscopic vision object is the movement speed. The mode of the movement of the stereoscopic vision object may be a way of the movement. For example, the way of the movement includes a movement in which the stereoscopic vision object avoids other stereoscopic vision objects or objects in actual space. Note that in order to avoid the objects or the like, the display position of the image for stereoscopic vision relating to the stereoscopic vision object may be changed.

In addition, while in the above embodiments, the movement speed of the stereoscopic vision object is not particularly mentioned, the movement speed may be constant during the movement or may change in the middle of the movement.

In addition, while in the above embodiment, the example has been described in which the stereoscopic vision object does not change during the movement, the stereoscopic vision object may change during the movement. For example, the appearance of the stereoscopic vision object such as shape, color, or content may be changed before or after, or during the movement of the stereoscopic vision object.

In addition, the information processing device 100 according to each embodiment of the present disclosure may be applied to the medical field, the agriculture field, or the automobile field. For example, in the medical field, an X-ray photograph, a magnetic resonance imaging (MRI) image or a surgical image, or an image displayed in the space of an operating room is displayed by the information processing device 100 so as to be stereoscopically viewed by the user. In this case, according to the configuration of each embodiment of the present disclosure, the movement control is performed so that the stereoscopic vision object in the vicinity of the user is perceived, whereby the user can check the medical image in more detail and it is possible to support more accurate medical practices.

In addition, in the agricultural field, when the farm work is performed, the information processing device 100 displays, for example, an image showing the work procedure so that the user can see the image stereoscopically. In this case, according to the configuration of each embodiment of the present disclosure, the movement control is performed so that the stereoscopic vision object in the vicinity of the user is perceived, whereby the user can check the work procedure in more detail and it is possible to improve work efficiency in agriculture.

In addition, in the automobile field, the information processing device 100 displays, for example, an image showing a vehicle, a pedestrian, or the like concealed by a building so that the user can see the image stereoscopically. In this case, according to the configuration of each embodiment of the present disclosure, the movement control is performed so that the stereoscopic vision object in the vicinity of the user is perceived, whereby an object that is not normally visible can be confirmed more reliably while the sense of distance is maintained, and it is possible to improve the safety in driving the automobile.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a processing in which steps shown in the flowcharts of the above embodiments are performed in a time-series manner in accordance with a described sequence but also a processing in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

An information processing device including:

a display control unit configured to perform movement control of a stereoscopic vision object perceived by a user from a start depth that is different from a target depth to the target depth on a basis of mode specifying information that specifies a mode of the movement control that supports stereoscopic vision by the user.

(2)

The information processing device according to (1), in which the start depth includes a depth closer to a virtual screen for display of the stereoscopic vision object than the target depth.

(3)

The information processing device according to (1) or (2), in which the mode of the movement control includes a determination of the start depth.

(4)

The information processing device according to (3), in which the start depth includes a depth so that a difference between the target depth and the start depth is a difference specified on the basis of the mode specifying information.

(5)

The information processing device according to any one of (1) to (4), in which the mode of the movement control includes a determination of the mode of the movement of the stereoscopic vision object.

(6)

The information processing device according to (5), in which the mode of the movement includes a movement speed of the stereoscopic vision object, and the movement speed includes a speed specified on the basis of the mode specifying information.

(7)

The information processing device according to any one of (1) to (6), in which the mode specifying information includes information regarding an attribute of the user or information regarding an exercise of the user.

(8)

The information processing device according to any one of (1) to (7), in which the mode specifying information includes information regarding a type of the stereoscopic vision object.

(9)

The information processing device according to any one of (1) to (8), in which the mode specifying information includes information regarding a visual mode of the stereoscopic vision object.

(10)

The information processing device according to (9), in which the information regarding the visual mode includes information regarding a depth of the stereoscopic vision object.

(11)

The information processing device according to (10), in which the information regarding the depth includes information regarding a difference between the target depth and the depth of the past stereoscopic vision object.

(12)

The information processing device according to any one of (9) to (11), in which the information regarding the visual mode includes information regarding a number of the stereoscopic vision objects.

(13)

The information processing device according to any one of (1) to (12), in which the mode specifying information includes information regarding an environment surrounding the user.

(14)

The information processing device according to any one of (1) (13), in which the mode of the movement control includes a determination of whether to move the stereoscopic vision object on the basis of the mode specifying information.

(15)

The information processing device according to any one of (1) to (14), in which in a case where the user's visual recognition of the stereoscopic vision object is interrupted while the stereoscopic vision object is moved, the display control unit moves the stereoscopic vision object again.

(16)

The information processing device according to any one of (1) to (15), in which when moving the stereoscopic vision object, the display control unit does not cause the user to perceive the stereoscopic vision object other than the stereoscopic vision object to be moved.

(17)

The information processing device according to any one of (1) to (16), in which the display control unit emphasizes presence of the stereoscopic vision object while the stereoscopic vision object is moved.

(18)

The information processing device according to any one of (1) to (17), in which axe information processing device is mounted on the user's head.

(19)

An information processing method including:

performing movement control of a stereoscopic vision object perceived by a user from a start depth that is different from a target depth to the target depth on a basis of mode specifying information that specifies a mode of the movement control that supports stereoscopic vision by the user.

(20)

A program causing a computer to realize:

a display control function of performing movement control of a stereoscopic vision object perceived by a user from a start depth that is different from a target depth to the target depth on a basis of mode specifying information that specifies a mode of the movement control that supports stereoscopic vision by the user.

REFERENCE SIGNS LIST 100 information processing device
102 image generating unit
104 display control unit
106 storage unit
108 display unit
110 user information acquisition unit
120 environment information acquisition unit

The invention claimed is:

1. An information processing device comprising:
   a display control unit configured to perform movement control of one or more stereoscopic vision objects perceived by a user from a start depth that is different from a target depth to the target depth on a basis of mode specifying information that specifies a mode of the movement control that supports stereoscopic vision by the user,
   wherein the mode specifying information includes information regarding a number of the one or more stereoscopic objects,
   wherein the mode of the movement control comprises a movement speed of the one or more stereoscopic objects from the start depth to the target depth,
   wherein the display control unit determines the movement speed of the one of more stereoscopic objects based on the number of the one or more stereoscopic objects,
   wherein, when the number of the one or more stereoscopic objects is greater than a threshold number, the movement speed is faster than when the number of the one or more stereoscopic objects is equal to or less than the threshold number, and
   wherein the display control unit is implemented via at least one processor.

2. The information processing device according to claim 1, wherein the start depth includes a depth closer to a virtual screen than the target depth.

3. The information processing device according to claim 1, wherein the mode of the movement control includes a determination of the start depth.

4. The information processing device according to claim 3, wherein the start depth includes a depth so that a difference between the target depth and the start depth is a difference specified on the basis of the mode specifying information.

5. The information processing device according to claim 1, wherein the mode of the movement control includes a determination of the mode of the movement of the one or more stereoscopic vision objects.

6. The information processing device according to claim 1, wherein the mode specifying information includes information regarding an attribute of the user or information regarding an exercise of the user.

7. The information processing device according to claim 1, wherein the mode specifying information includes information regarding a type of the one or more stereoscopic vision objects.

8. The information processing device according to claim 1, wherein the mode specifying information includes information regarding a visual mode of the one or more stereoscopic vision objects.

9. The information processing device according to claim 8, wherein the information regarding the visual mode includes information regarding a depth of the one or more stereoscopic vision objects.

10. The information processing device according to claim 9, wherein the information regarding the depth includes information regarding a difference between the target depth and a depth of a past stereoscopic vision object.

11. The information processing device according to claim 1, wherein the mode specifying information includes information regarding an environment surrounding the user.

12. The information processing device according to claim 1, wherein the mode of the movement control includes a determination of whether to move the one or more stereoscopic vision objects on the basis of the mode specifying information.

13. The information processing device according to claim 1, wherein in a case where the user's visual recognition of the one or more stereoscopic vision objects is interrupted while the stereoscopic vision object is moved, the display control unit moves the one or more stereoscopic vision objects again.

14. The information processing device according to claim 1, wherein when moving the one or more stereoscopic vision objects, the display control unit prevents stereoscopic vision objects other than the one or more stereoscopic vision objects from being moved.

15. The information processing device according to claim 1, wherein the display control unit emphasizes presence of the one or more stereoscopic vision objects while the one or more stereoscopic vision objects are moved.

16. The information processing device according to claim 1, wherein the information processing device is mounted on the user's head.

17. The information processing device according to claim 1, wherein the threshold number is one.

18. An information processing method, executed by at least one processor, the method comprising:
   performing movement control of one or more stereoscopic vision objects perceived by a user from a start depth that is different from a target depth to the target depth on a basis of mode specifying information that specifies a mode of the movement control that supports stereoscopic vision by the user,
   wherein the mode specifying information includes information regarding a number of the one or more stereoscopic objects,
   wherein the mode of the movement control comprises a movement speed of the one or more stereoscopic objects from the start depth to the target depth,
   wherein the movement speed of the one of more stereoscopic objects is determined based on the number of the one or more stereoscopic objects, and
   wherein, when the number of the one or more stereoscopic objects is greater than a threshold number, the movement speed is faster than when the number of the one or more stereoscopic objects is equal to or less than the threshold number.

19. A non-transitory computer-readable medium having embodied thereon a program, which when executed by a computer causes the computer to execute a method, the method comprising:
   performing movement control of a stereoscopic vision object perceived by a user from a start depth that is different from a target depth to the target depth on a basis of mode specifying information that specifies a mode of the movement control that supports stereoscopic vision by the user,
   wherein the mode specifying information includes information regarding a number of the one or more stereoscopic objects,
   wherein the mode of the movement control comprises a movement speed of the one or more stereoscopic objects from the start depth to the target depth,
   wherein the movement speed of the one of more stereoscopic objects is determined based on the number of the one or more stereoscopic objects, and
   wherein, when the number of the one or more stereoscopic objects is greater than a threshold number, the movement speed is faster than when the number of the one or more stereoscopic objects is equal to or less than the threshold number.

* * * * *